United States Patent Office 3,347,752
Patented Oct. 17, 1967

3,347,752
MICROBIOLOGICAL CLEAVAGE PROCESS FOR RESOLVING RACEMIC α-METHYL-β-(3,4,-DIHYDROXYPHENYL)-ALANINE
Erich Rauenbusch and Werner Frommer, Wuppertal-Elberfeld, Germany, assignors, by mesne assignments, to Merck & Co., Inc., Rahway, N.J., a corporation of New Jersey
No Drawing. Filed Mar. 26, 1965, Ser. No. 443,093
7 Claims. (Cl. 195—29)

ABSTRACT OF THE DISCLOSURE

A process is described whereby one optical antipode of a racemic mixture of α-methyl-β-[3,4-dihydroxy(or dialkoxy)phenyl]alanine ester derivative is deesterified through the action of certain stereospecific deesterifying microorganisms, thereby permitting the separation of the D- and L-isomers by physical means such as solvent extraction and isolation of L-α-methyl-β-(3,4 - dihydroxyphenyl)alanine, which is useful in the treatment of hypertension.

The present invention relates to the resolution into its optical antipodes of racemic α-methyl-β-(3,4-dihydroxyphenyl)-alanine and, more particularly, to the use of certain fungi which have been found to have stereo specific power of splitting the above racemate.

D,L-α-methyl-β-(3,4 - dihydroxyphenyl)-alanine is distinguished by its favorable action on blood pressure. There has, therefore, been no lack of research for the purpose of synthesizing this compound. It is the case, however, that the product produced in this way is in the form of a racemate which desirably is separated into its optical antipodes since the above useful biological activity is due only to the L-form. If the separation of the racemate is given up, then in the dispensing of the product the non-active D-form is carried along as ballast, this being very unfavorable as the product must be administered in proportionately high dosage.

In accordance with the invention it is possible to split the racemate of α-methyl-β-(3,4-dihydroxyphenyl)-alanine into its optical antipodes by allowing suitable fungi or extracts prepared therefrom to act in aqueous medium on derivatives of the formula:

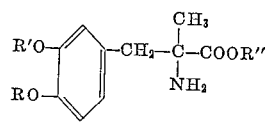

wherein R and R' are each hydrogen or an alkyl radical of 1 to 4 carbon atoms, in which the two alkyl radicals R and R' can also be linked together in a single alkylene chain, or acyl of 1 to 18 carbon atoms which can be substituted by a carboxyl or carboalkoxy group, and R'' is a straight or branched alkyl group of 1 to 6 carbon atoms, thereby separating the available free L- or D-acid from the stable D- or L-ester and in addition, splitting off the acyl, alkyl or alkylene group R or R' which is present.

It is known that stereo-specific cleavages of derivatives of naturally occurring α-amino acids can be carried out with animal or plant enzymes (cf. J. P. Greenstein, A. M. Winitz "Chemistry of the Aminoacids," vol. 1, p. 728; John Wiley and Sons, Inc., 1961, N.Y. and London).

All such cleavage investigations in the case existing here, however, are striking failures which are traceable back to the additional and unnatural substitution of the α-carbon atom by the methyl group. It was therefore not to be foreseen that by a special process micro-organisms would be found which form enzymes to separate stereoselectively the derivatives of α-methyl-β-(3,4-dihydroxyphenyl)-alanine. Suitable fungi for the carrying out of the process of the invention are found in the following way: there is added to sterile nutrient solutions which contain 1% of one of the amino esters corresponding to the foregoing formula and in addition, the necessary salts of an inorganic source of nitrogen, soil samples of differing origin and carrying out incubation in a shaking machine at 28° C.

At different time intervals samples are taken in which any amino acid present is detected chromatographically. After several days there is actual detection of amino acids in individual cultures. Those cultures in which this is the case contain micro-organisms which are capable of effecting cleavage.

These micro-organisms are appropriately enriched or concentrated by allowing them to percolate several passages in a like nutrient solution. In these nutrient solutions, only such identical micro-organisms can multiply themselves which are suitable for a single cleavage since only these strains can, for their propagation, make use of the carbon source necessary for the cleavage. They use for the synthesis of their cell substance and respiration only the radical R''; the acid which remains, as has been shown by various investigations, is practically inactive in contrast to the 3,4-dialkoxyphenyl-alanine compounds.

The enriched cultures in which, through repeated selection, fungi of the same strain are found to predominate are spread out on agar culture media. After incubation, single typically appearing developing colonies are inoculated in slant tubes.

The thus found fungi are then introduced in a preparatory cleavage experiment whereby it is established whether the cleavage proceeds stereo-selectively. In a large part of the isolated strains, this is the case.

In the carrying out of this test procedure, numerous strains of fungi are found. These belong, as microscopic examinations show, to different systematic categories.

In the class of the higher fungi isolated there were found numerous suitable penicillium strains, for example, Penicillium janthinellum Biourge (Do 29, Do 96) and Penicillium daleae Zaleski (Do 120). Also from the lower fungi isolated there were found numerous suitable strains, for example, Mortierella ramanniana (Moller) Linnemann (Do 99) and from the class fungi imperfecti numerous strains were found, for example, Cephalosporium cifferii Verona (Do 23) and Trichoderma viride (Pers.) ex. Fr. (Do 131). Besides those mentioned, there are other strains registered in the Central Bureau for Mold Cultures in Baarn, Holland (August 1, 1963), as well as numerous other suitable strains.

The splitting of the amino ester proceeds relatively slowly when the fungus is allowed to grow without an added source of carbon, also when it is massively inoculated with a pure culture. It is recommended, therefore, for the acceleration of the cleavage to add a source of carbon for the growth of the fungus, for example, 0.1 to 0.5% lactic acid ethylester, glucose or glycerine. The cleavage proceeds even more rapidly when the fungi are allowed to stand for about 48 to 72 hours without addition of the compound to be split in a complex nutrient solution and then the compound to be split is added thereto. The working up or finishing after the cleavage is facilitated in this instance if the fungi, after the growth phase, are centrifuged, washed with water and then the separated compounds are put into aqueous fungi suspension.

The latter working procedure is especially recommended when working with the free 3,4 - dihydroxy compounds. These are autoxidizable in neutral to alkaline conditions. Since the isolation of the fungi according to the above described procedure may require several weeks, these compounds become completely oxidized. It is possible, however, to isolate the fungi on O - alkylated compounds and to use it later for the splitting of the free 3,4 - dihydroxy compounds. The fungi are suitably allowed to grow and then the compound to be split is added to the dense washed or unwashed fungus suspension under nitrogen or under simultaneous acidification.

The process in accordance with the invention depends on the fact that the fungi used in the above-mentioned amino esters split only one optical antipode. The separation of the one split optical antipode from the other non-split optical antipode can be carried out in accordance with any of the generally usual methods, for example, by extraction with solvents.

The invention is illustrated by the following non-limitative examples:

Example I

An aqueous nutrient solution which contains 0.5% lactic acid ethyl ester, 0.2% of KH$_2$PO$_4$, 0.2% of (NH$_4$)SO$_4$ and traces of MgSO$_4$ and FeSO$_4$ is adjusted to pH 6.0, sterile filtered and filled into 1 liter Erlenmeyer flasks in the amount of 50 ml. each. There is added thereto to each under sterile conditions 4 ml. of aqueous 5% CaCO$_3$ suspension (sterilized in autoclave at 121° C. for 1 hour) and inoculated with a spore suspension of the strain Do 120. This culture is incubated for 3 days at 28° C. in a circular shaking machine. Then there is added under sterile conditions 10 ml. of sterile filtered 5% D,L-α-methyl - β - (3,4 - dimethoxyphenyl) - alanine - ethyl ester solution and incubated anew at 28° C. in a circular shaking machine. After a further 3 day period the flasks are gathered, adjusted when necessary to pH 4–5 and the mycelium removed by centrifugation (10 minutes at 20,000 x g). The supernatant is adjusted with about 20% caustic soda to pH 10 and shaken out 3 times with acetic acid ethyl ester.

The organic phase which contains the residual α-methyl - β - (3,4 - dimethoxyphenyl) - alanine - ethyl ester is washed with a little water, dried with anhydrous sodium sulphate, filtered and the solvent distilled off under vacuum. To the residue there is added 10 ml. of anhydrous pyridine and 10 ml. of acetic anhydride and the mixture is allowed to stand sealed for 20 hours at 37° C. The acetylating reagents are completely removed under vacuum, the residue washed and dissolved in methanol for the measurement of the optical rotation.

The aqueous phase which contains the α-methyl-β-(3,4 - dimethoxyphenyl) - alanine is neutralized with about 17% hydrochloric acid, then freeze-dried and the residue mixed with 10 ml. of anhydrous pyridine and 10 ml. of acetic anhydride, shaken and allowed to stand at 37° C. for 20 hours. The suspension is evaporated in a vacuum, dissolved in 40 ml. of water, adjusted to pH 7 and filtered. The filtrate is adjusted to pH 2 with 17% hydrochloric acid and shaken out 3 times with acetic acid ethyl ester. The combined organic phases are washed with water and dried with anhydrous sodium sulphate. The filtered solution is evaporated under vacuum and the weighed residue dissolved in methanol for the measurement of the optical rotation. The results are given in Table 1.

Example II

There is added to a mixture in accordance with Example I 30 ml. instead of 10 ml. of 5% D,L-α-methyl-β - (3,4 - dimethoxyphenyl) - alanine - ethyl ester solution and further worked up as in Example I obtaining the results stated in Table 2.

Example III

A nutrient solution is inoculated in accordance with Example I but with 100 ml. of nutrient solution to each Erlenmeyer flask which contains 0.5% of glycerine instead of 0.5% of lactic acid ethyl ester with a spore suspension of strain Do 99 and there is added after a 3 day incubation 20 ml. of 5% D,L - α - methyl - β - (3,4 - dimethoxyphenyl) - analine - ethyl ester solution, thereby obtaining after a further incubation period of 1 day by working up according to Example I the values stated in Table 3.

Example IV

A 5% diamalt solution (100 ml. in 1 liter Erlenmeyer flasks) sterilized at 121° C. for 1 hour, adjusted to pH 4.5 with H$_3$PO$_4$, is inoculated with a spore suspension of strain Do 23 and incubated 3 days in a circular shaking machine at 28° C. Thereafter the mycelium is centrifuged off, washed 3 times with phosphate buffer solution (1/7 molar) at pH 4.0 or 5.0 and the mycelium resuspended in the same buffer solution which, however, contains 1% of D,L - α - methyl - β - (3,4 - dimethoxyphenyl) - analine-ethyl ester. After a further incubation period of 4 days at 28° C. working up is carried out according to Example I, the results of which are shown in Table 4.

Example V

Proceeding in the same manner as Example IV with strain Do 99, the values are obtained which are shown in Table 5.

Example VI

A mixture in accordance with Example IV, but adjusted as to the preliminary and main cultures to pH 4.5, is inoculated with a spore suspension of strain Do 29 and further worked up as in Example IV. The results obtained are set forth in Table 6.

Example VII

5% diamalt solution (100 ml. in 1 liter Erlenmeyer flasks) sterilized at 121° C. for 1 hour, adjusted to pH 4.5 with H$_3$PO$_4$ is inoculated with a spore suspension of strain Do 99 and incubated for 3 days at 28° C. in a circular shaking machine. Thereafter the mycelium is centrifuged off, washed 3 times with phosphate buffer solution (1/7 molar) at pH 4.5 and the mycelium resuspended anew in the same buffer solution which, however, contains 1% of D,L-α-methyl-β-(3,4-dimethoxyphenyl) - alanine - butyl ester. After a further incubation period of 4 days at 28° C. the working up is carried out as follows:

The pH of the suspension when necessary is adjusted to pH 5–6 and the mycelium removed by centrifugation (10 minutes at 20,000 x g). The supernatant is freeze-dried and acetylated at 37° C. for 20 hours by the addition of 15 ml. of anhydrous pyridine and 15 ml. of acetic anhydride. The suspension is evaporated under vacuum. The residue is mixed with 15 ml. of 0.5 N-acetic acid and extracted 3 times with acetic acid ethyl ester. The organic phase is shaken out 3 times with aqueous sodium bicarbonate solution.

The organic phase which contains the unsplit ester is washed with water, dried with anhydrous sodium sulphate, decolorized when necessary with activated carbon, filtered and evaporated under vacuum. The weighed residue is dissolved in methanol for the measurement of the optical rotation.

The bicarbonate containing aqueous phase is adjusted to pH 2 with concentrated hydrochloric acid and shaken out 3 times with acetic acid ethyl ester. Thereby the α-methyl-β-(3,4-dimethoxyphenyl)-analine goes into the organic phase which is dried with anhydrous sodium sulphate, decolorized when necessary with activated carbon, filtered and evaporated to dryness under vacuum. The residue is weighed and dissolved in methanol for the measurement of the optical rotation. The result is seen in Table 7.

β-(3,4-methylenedihydroxyphenyl)-alanine-methyl ester, thus giving, after a further 3 day incubation at 23° C. and working up of the mixture in the manner of Example I, α-methyl-β-(3,4-methylenedihydroxyphenyl)-N-acetyl-alanine-methyl ester which, at a specific rotation of $[\alpha]_D^{22} = +67.8°$, consists of up to 96% of D (+) α-methyl-β-(3,4-methylenedihydroxyphenyl)-N-acetyl-alanine-methyl ester.

TABLE 1

| Amount of Starting Material (Mg.) | Recovered α-methyl-β-(3,4-dimethoxyphenyl)-alanine-ethyl ester isolated as the N-acetyl derivative | | | α-Methyl-β-(3,4-dimethoxyphenyl)-alanine isolated as the N-acetyl derivative | | |
|---|---|---|---|---|---|---|
| | Yield | Specific Rotation $[\alpha]_D^{22}$ | Purity of the isomer, percent | Yield | Specific Rotation $[\alpha]_D^{22}$ | Purity of the isomer, percent |
| | (Mg.) | percent | | | (Mg.) | percent | |
| 500 | 137 | 23 | +40.6 | 78 | 144 | 26 | −20.2 | 68 |

TABLE 2

| Amount of Starting Material (Mg.) | Recovered α-methyl-β-(3,4-dimethoxyphenyl)-alanine-ethyl ester isolated as the N-acetyl derivative | | | α-Methyl-β-(3,4-dimethoxyphenyl)-alanine isolated as the N-acetyl derivative | | |
|---|---|---|---|---|---|---|
| | Yield (Mg.) | percent | Specific Rotation $[\alpha]_D^{22}$ | Purity of the isomer, percent | Yield (Mg.) percent | Specific Rotation $[\alpha]_D^{22}$ | Purity of the isomer, percent |
| 1,500 | 830 | 47 | +47.3 | 83 | 297 | 18 | −34.1 | 80 |

TABLE 3

| Amount of Starting Material (Mg.) | Recovered α-methyl-β-(3,4-dimethoxyphenyl)-alanine-ethyl ester isolated as the N-acetyl derivative | | | α-Methyl-β-(3,4-dimethoxyphenyl)-alanine isolated as the N-acetyl derivative | | |
|---|---|---|---|---|---|---|
| | Yield (Mg.) | percent | Specific Rotation $[\alpha]_D^{22}$ | Purity of the isomer, percent | Yield (Mg.) percent | Specific Rotation $[\alpha]_D^{22}$ | Purity of the isomer, percent |
| 1,000 | 618 | 55 | +31.2 | 71 | 237 | 23 | −40.7 | 86 |

Example VIII

5% diamalt solution (100 ml. in 1 liter Erlenmeyer flasks) sterilized at 121° C. for 1 hour, adjusted to pH 4.5 with $H_3PO_4$, is inoculated with a spore suspension of strain Do 29 and incubated for 3 days in a circular shaking machine at 28° C. Thereafter the mycelium is centrifuged off, washed 3 times with phosphate buffer solution (1/7 molar) at pH 4.0 and the mycelium resuspended anew in the same buffer solution which, however, contains 1% of D,L-α-methyl-β-(3,4-dihydroxyphenyl)-alanine-ethyl ester. After a further incubation period of 4 days at 28° C. there is obtained a suspension which is worked up as in Example VII and the results of which are given in Table 8.

Example IX

A mixture in accordance with Example IV whose initial pH is adjusted to 7.0 instead of 4.5 is inoculated with a spore suspension of strain Do 131, the mycelium washed after incubation for 3 days with phosphate buffer solution (1/7 molar) at pH 7.0 and resuspended in a phosphate buffer solution of the same concentration and the same pH value, which contains 1% of D,L-α-methyl-

TABLE 4

| Initial pH | Amount of Starting Material (Mg.) | α-Methyl-β-(3,4-dimethoxyphenyl)-alanine isolated as the N-acetyl derivative | | | |
|---|---|---|---|---|---|
| | | Yield (Mg.) | Percent | Specific Rotation $[\alpha]_D^{22}$ | Purity of the isomer, percent |
| 4.0 | 1,000 | 101 | 10 | −32.0 | 79 |
| 5.0 | 1,000 | 108 | 11 | −34.0 | 80 |

TABLE 5

| Initial pH | Amount of Starting Material (Mg.) | α-Methyl-β-(3,4-dimethoxyphenyl)-alanine isolated as the N-acetyl derivative | | | |
|---|---|---|---|---|---|
| | | Yield (Mg.) | Percent | Specific Rotation $[\alpha]_D^{22}$ | Purity of the isomer, percent |
| 5.0 | 1,000 | 93 | 9 | −39.6 | 85 |

TABLE 6

| Amount of Starting Material (Mg.) | Recovered α-methyl-β-(3,4-dimethoxy-phenyl)-alanine-ethyl ester isolated as the N-acetyl derivative | | | | α-Methyl-β-(3,4-dimethoxyphenyl)-alanine isolated as the N-acetyl derivative | | | |
|---|---|---|---|---|---|---|---|---|
| | Yield | | Specific Rotation $[\alpha]_D^{22}$ | Purity of the isomer, percent | Yield | | Specific Rotation $[\alpha]_D^{22}$ | Purity of the isomer, percent |
| | (Mg.) | percent | | | (Mg.) | percent | | |
| 1,000 | 433 | 39 | +57.7 | 90 | 364 | 36 | −26.8 | 74 |

TABLE 7

| Amount of Starting Material (Mg.) | Recovered α-methyl-β-(3,4-dimethoxy-phenyl)-alanine-ethyl ester isolated as the N-acetyl derivative | | | | α-Methyl-β-(3,4-dimethoxyphenyl)-alanine isolated as the N-acetyl derivative | | | |
|---|---|---|---|---|---|---|---|---|
| | Yield | | Specific Rotation $[\alpha]_D^{22}$ | Purity of the isomer, percent | Yield | | Specific Rotation $[\alpha]_D^{22}$ | Purity of the isomer, percent |
| | (Mg.) | percent | | | (Mg.) | percent | | |
| 1,000 | 513 | 41 | +32.2 | 76 | 154 | 16 | −38.7 | 85 |

TABLE 8

| Amount of Starting Material (Mg.) | Recovered α-methyl-β-(3,4-dihydroxy-phenyl)-alanine-ethyl ester isolated as the Tri-acetyl derivative | | | | α-Methyl-β-(3,4-dihydroxyphenyl)-alanine isolated as the Tri-acetyl derivative | | | |
|---|---|---|---|---|---|---|---|---|
| | Yield | | Specific Rotation $[\alpha]_D^{22}$ | Purity of the isomer, percent | Yield | | Specific Rotation $[\alpha]_D^{22}$ | Purity of the isomer, percent |
| | (Mg.) | percent | | | (Mg.) | percent | | |
| 1,000 | 790 | 53 | +17.7 | 59 | 167 | 24 | −46.4 | 85 |

What is claimed is:

1. A process for resolving racemic α-methyl-β-(3,4-dihydroxyphenyl)-alanine into its optical antipodes which comprises causing a substance selected from the group consisting of stereo-selective desterifying fungi and extracts prepared therefrom to act in aqueous medium on a derivative of the formula:

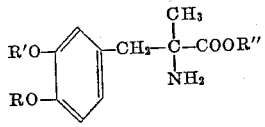

wherein R and R' are each selected from the group consisting of hydrogen, alkyl of 1 to 4 carbon atoms, R and R' linked together to form a single alkylene chain, acyl of 1 to 18 carbon atoms, acyl of 1 to 18 carbon atoms which is carboxy substituted and acyl of 1 to 18 carbon atoms which is carboalkoxy substituted, and R" is selected from the group consisting of straight and branched alkyl chains of 1 to 6 carbon atoms.

2. A process in accordance with claim 1 wherein the L-form is isolated and purified.

3. A process in accordance with claim 1 wherein the fungi are selected from the group consisting of *Penicillium janthinellum Biourage*, *Penicillium daleae Zaleski*, *Mortierella ramamiana (Moller) Linnemann*, *Cephalosporium cifferii Verona* and *Trichoderma viride* (Pers.) ex. Fr.

4. A process in accordance with claim 3 which is carried out in the presence of a nutrient solution containing a source of carbon selected from the group consisting of lactic acid ester, glucose and glycerine, inorganic salts constituting sources of phosphorus and nitrogen and traces of metals.

5. A process in accordance with claim 4 wherein the trace metals are present as iron and magnesium sulphates.

6. A process in accordance with claim 1 wherein the derivative is D,L-α-methyl-β-(3,4-dimethoxyphenyl)-alanine-ethyl ester.

7. A process in accordance with claim 1 wherein the derivative is D,L-α-methyl-β-(3,4-dimethoxyphenyl)-alanine-butyl ester.

References Cited
UNITED STATES PATENTS 3,256,156  6/1966  Frommer et al. ——————— 195—30
3,290,225  12/1966  Rauenbusch et al. ————— 195—29

A. LOUIS MONACELL, *Primary Examiner.*

L. M. SHAPIRO, *Assistant Examiner.*